(12) United States Patent
Khamithar et al.

(10) Patent No.: US 10,704,587 B2
(45) Date of Patent: Jul. 7, 2020

(54) CAPTIVE FASTENER ASSEMBLY

(71) Applicant: Tejas Networks Limited, Bangalore, Karnataka (IN)

(72) Inventors: Babu Rao Khamithar, Karnataka (IN); Basavaraja M, Karnataka (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 152 days.

(21) Appl. No.: 14/048,050

(22) Filed: Oct. 8, 2013

(65) Prior Publication Data

US 2014/0096363 A1 Apr. 10, 2014

(30) Foreign Application Priority Data

Oct. 8, 2012 (IN) .............. 4170/CHE/2012

(51) Int. Cl.
*F16B 29/00* (2006.01)
*F16B 5/02* (2006.01)

(52) U.S. Cl.
CPC ............ *F16B 29/00* (2013.01); *F16B 5/0208* (2013.01); *Y10T 29/49948* (2015.01)

(58) Field of Classification Search
CPC ...... F16B 5/0208; F16B 5/025; F16B 5/0258; F16B 41/002; Y10T 29/49948; Y10T 29/49963; Y10T 29/49881
USPC ....... 411/353, 383, 424, 517, 521, 943, 535, 411/999, 411, 533, 541
See application file for complete search history.

(56) References Cited

U.S. PATENT DOCUMENTS

| | | | | |
|---|---|---|---|---|
| 1,755,590 A | * | 4/1930 | Carr ................. | A44B 1/30 411/427 |
| 2,429,833 A | * | 10/1947 | Luce ................ | F16B 5/025 411/84 |
| 2,967,557 A | * | 1/1961 | Tait ................. | F16B 5/0208 411/349 |
| 3,180,389 A | * | 4/1965 | Frank .............. | F16B 5/0208 411/350 |
| 3,209,806 A | * | 10/1965 | Currier et al. ............... | 411/361 |
| 3,218,906 A | * | 11/1965 | Dupree ............ | 411/533 |
| 3,250,559 A | * | 5/1966 | Sommerfeld ...... | F16B 5/0208 29/512 |
| 3,343,581 A | * | 9/1967 | Martin ............. | F16B 5/0208 292/251 |
| 3,465,803 A | * | 9/1969 | Swanstrom ...... | F16B 5/0208 411/349 |
| 3,571,904 A | * | 3/1971 | Gulistan ........... | 29/443 |
| 4,387,497 A | * | 6/1983 | Gulistan .......... | B23P 11/00 29/511 |
| 4,464,090 A | * | 8/1984 | Duran ............. | 411/103 |

(Continued)

*Primary Examiner* — Jason L Vaughan
(74) *Attorney, Agent, or Firm* — Oliff PLC (57) ABSTRACT

A method and device for a captive fastener assembly comprising of a fastener including a head and a shaft, the shaft comprising of a threaded section and an unthreaded section being interposed between the head and the threaded section. A standoff accommodating the fastener permanently fastened to the first surface and enabling the fastener to have an angular and circular motion within the standoff and fastening the first surface with the other surface by placing the surfaces together so that the fastener is substantially aligned with the receiving nut on the other surface for coupling, wherein a marginal offset for the alignment of fastener with the female part of the other surface is allowed.

7 Claims, 9 Drawing Sheets

(56) References Cited

U.S. PATENT DOCUMENTS

| | | | | |
|---|---|---|---|---|
| 4,464,091 | A * | 8/1984 | Molina | F16B 5/0208 |
| | | | | 411/105 |
| 4,915,557 | A * | 4/1990 | Stafford | F16B 5/0208 |
| | | | | 292/251 |
| 5,073,070 | A * | 12/1991 | Chang | 411/353 |
| 5,336,028 | A * | 8/1994 | Yamamoto | F16B 5/0208 |
| | | | | 403/21 |
| 5,642,972 | A * | 7/1997 | Ellis et al. | 411/353 |
| 5,865,582 | A * | 2/1999 | Ellis et al. | 411/353 |
| 6,309,156 | B1 * | 10/2001 | Schneider | 411/353 |
| 6,309,158 | B1 * | 10/2001 | Bellinghausen | F16B 5/0208 |
| | | | | 411/107 |
| 6,644,903 | B1 * | 11/2003 | Arand | 411/352 |
| 6,736,578 | B2 * | 5/2004 | McIninch | 411/352 |
| 6,761,521 | B2 * | 7/2004 | McCormack et al. | 411/353 |
| 7,021,876 | B2 * | 4/2006 | Gulistan | 411/353 |
| 7,179,037 | B2 * | 2/2007 | Aukzemas et al. | 411/353 |
| 7,213,321 | B2 * | 5/2007 | Franco et al. | 29/453 |
| 7,278,809 | B2 * | 10/2007 | Aukzemas et al. | 411/432 |
| 8,246,281 | B2 * | 8/2012 | Gulistan | 411/353 |
| 8,506,224 | B2 * | 8/2013 | Cosenza et al. | 411/353 |
| 8,740,530 | B2 * | 6/2014 | Cosenza et al. | 411/353 |
| 8,794,889 | B2 * | 8/2014 | Aukzemas et al. | 411/353 |
| 8,827,614 | B2 * | 9/2014 | Tseng | 411/107 |
| 8,893,369 | B2 * | 11/2014 | Wang | 29/453 |
| 2003/0175091 | A1 * | 9/2003 | Aukzemas et al. | 411/107 |
| 2008/0056844 | A1 * | 3/2008 | Aukzemas et al. | 411/353 |
| 2009/0202319 | A1 * | 8/2009 | Wang | F16B 5/0208 |
| | | | | 411/353 |
| 2014/0321942 | A1 * | 10/2014 | Aukzemas et al. | 411/353 |
| 2015/0152902 | A1 * | 6/2015 | Bachman et al. | |

* cited by examiner

Figure 10

CAPTIVE FASTENER ASSEMBLY

REFERENCE TO PRIORITY APPLICATION

This application claims priority from Indian Non-provisional Application Serial No. 4170/CHE/2012 filed Oct. 8, 2012, entitled "CAPTIVE FASTENER ASSEMBLY", which is incorporated herein by reference in its entirety.

FIELD OF INVENTION

This invention generally relates to captive fastener assemblies and in particular to captive fastener assemblies for fastening field replaceable units (FRU) within the chassis of telecommunication network systems.

BACKGROUND OF THE INVENTION

Telecommunication circuit networks essentially consist of electronic devices arranged in a system. This system provides for a front panel consisting of a face plate, printed circuit board (PCB), a latch mechanism on either side of the face plate to fasten the front panel with the chassis. The face plate area through the openings is the access point to the services offered by the PCB. At times the front panel comprising of PCB, a latch mechanism on either side, is often referred to as the field replacement unit (FRU) or card. An FRU/card performs certain specific functions which includes providing support to the entire telecommunication network system. Hence a telecommunication network system may require a number of such cards arranged in a particular sequence enabling to co-ordinate the specific functions of each card so as to support the telecommunication network system. The above FRU/card is often needed to be removed and fixed for up-gradation of services offered by the FRU, a routine check or for servicing the FRU. The FRU is fastened to the chassis or enclosure through the card cage by a fastening mechanism comprising of a floating captive screw on the sides of the face plate.

Floating captive screws are commonly used to fasten removable covers or enclosures when it is desired to keep the screw in position without losing it. A captive screw generally is fitted in housing, for example, a panel. A screw is inserted through the housing and retained therein such that the housing retains the screw even when the screw is not engaged in a threaded bore or receiving nut. These screws owing to its floating nature couple with the floating nuts provided on the card cage with a given allowable offset range. At times it so happens that, the floating captive screw because of its floating nature is inclined or oriented to an extent where it misaligns with the receiving nut provided on the card cage and at times there is complete mismatch of alignment between the screw axis and the receiving floating nut. Further the threaded portion of the captive screw is always projected towards the card cage within the chassis and so the projection of the threaded portion between the face plate and the card cage causes the FRU to misalign or incomplete insertion or jack-in thereby giving rise to improper attachment of PCB with the backplane of the system. Therefore one has to check the jack in every time an FRU is removed (or jacked-out) and replaced. Further there are chances that this captive screw may get stuck in its inclined position leaving a substantial threaded portion in-between the face plate and the card cage thus damaging the captive screw or face plate of FRU.

Once the captive screw gets damaged, the entire unit comprising of captive screw with the face plate has to be replaced which involves additional cost. Repeated jacking in and trying to couple the screw with the nut, in case of misalignment of captive screw with the floating receiving nut in the card guide may damage the chassis also. If the screw head is damaged due to repeated screwing and unscrewing, one has to replace the entire face plate assembly of FRU. Therefore a fastening mechanism providing for a detachable captive floating screw for effective fastening of two parts by aligning the captive screw with the receiving nut on the card guide is required.

SUMMARY OF THE INVENTION

The present invention provides for a captive fastener assembly for fastening plurality of surfaces, for example, in fastening the face plate to the card guide of a telecommunication system.

Accordingly the subject invention provides for a captive fastener assembly comprising of a fastener including a head and a shaft, the shaft comprising of a threaded section and an unthreaded section being interposed between the head and the threaded section. A standoff permanently fastened to the first surface accommodating the fastener and enabling the fastener to have an angular and circular motion within the standoff and fastening the first surface with the other surface by placing the surfaces together so that the fastener is substantially aligned with the receiving nut of the other surface for coupling, wherein a marginal offset for the alignment of fastener with the receiving nut on the other surface is allowed.

Another aspect of the invention provides for a captive fastener assembly comprising of a standoff, wherein the standoff includes an enlarged hollow internally threaded portion at one end, and a hollow shank at the other end, wherein the distal end of the hollow shank which is adapted to deform during forming operation to form a permanent fastening joint such that the deformed part flushes with the other side of the first surface in a frusto-conical shape. The said fastener upon engagement with the enlarged portion of the standoff has a substantial circular and angular floating movement.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAIL DESCRIPTION OF THE INVENTION

The following description with reference to the accompanying drawings is provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
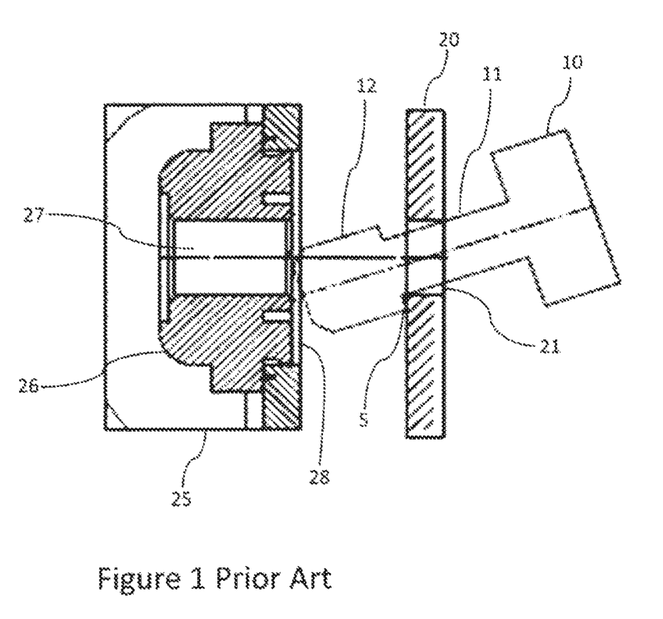
FIG. 1 depicts a sectional view of a type of fastening mechanism known in the prior art.

The conventional fastening mechanism employed in attaching telecommunication field replacement units (FRU) with the card cage of the chassis known in the prior art is shown in FIG. 1. A fastener assembly comprising of a captive screw with a head portion 10 and the shank portion 11 trapped within the threaded hole 21 of the face plate 20 such that the angular and circular motion of the screw is facilitated by the relative difference in size between the threaded hole 21 and the size of the shank 11. External threaded portion 12 of the screw and the internal threaded portion 21 of the face plate are of same dimensions. Unscrewing of the screw is required to take the screw out of the face plate 20. While fastening the faceplate 20 with the card cage 25, the threaded portion 12 of the screw protrudes towards the receiving portion of the card cage 28 and at times owing to the angular motion of the screw it so happens that upper part 5 of the threaded portion 12 gets stuck with the edges of the face plate 20 around the threaded hole 21 resulting in the misalignment of the screw with the receiving nut 27 which is caged within an enclosure 26 in the card cage 25 enabling floating movement to the nut. During jacking in of such FRU within the card cage, the threaded portion 12 stuck in between the face plate 20 and the card cage portion 28 causes damage to the card cage as well as to the face plate. Further applying force to cause alignment of the screw with the nut may damage the face plate and the screw thus leading to replacement of the screw, which in turn causes replacement of the entire assembly including the face plate 20.

Figure 2:
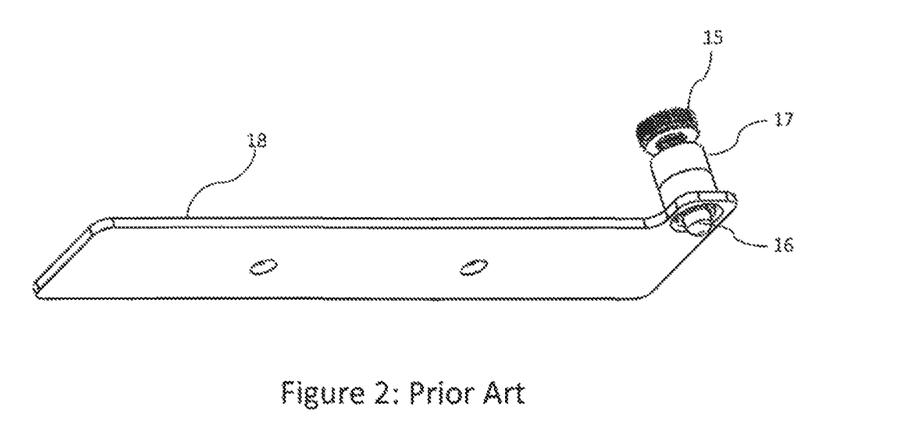
FIG. 2 is an isometric view of a fastener assembly known in the prior art.

Another fastening mechanism employed in attaching telecommunication field replacement units (FRU) with the card cage of the chassis known in the prior art is shown in FIG. 2. To overcome the above said disadvantages, the fastener assembly as shown in FIG. 2 is employed. Here, the fastener assembly comprises of a captive screw 15 engaged within a standoff 17. A part of the threaded section 16 of the captive screw is projected outwards so as to engage with the receiving nut of the card cage. The disadvantage associated with this type of fastening mechanism is that while attaching the FRU with the card cage, a small misalignment of the screw axis with the nut axis may arise which necessitates applying more force on the screw head 15 causing it to align with the receiving nut and then screwing up with a device for e.g., a screw driver. Repeated such operation damages the screw head causing for its replacement. A damaged screw head 15 or a worn out screw causes the entire assembly including the face plate 18 to be replaced as the captive screw assembly is permanently attached with the face plate, thereby adding to the cost.

FIGS. 3 to 10 depicts the captive fastener assembly for attaching the FRU with the card cage of the telecommunication system embodying the principles of the present invention that removes the above said disadvantages in the above prior art and provides for other advantages.

Figure 3:
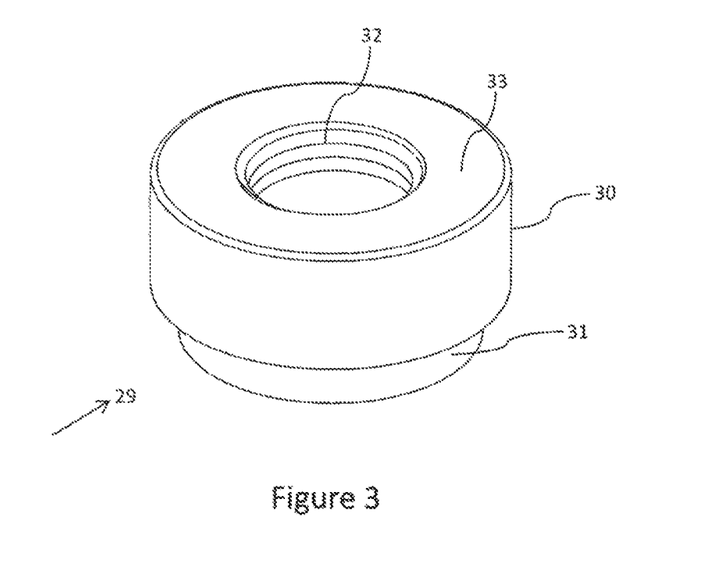
FIG. 3 is an isometric front view of the standoff, embodying the principles of the present invention.
Figure 4:
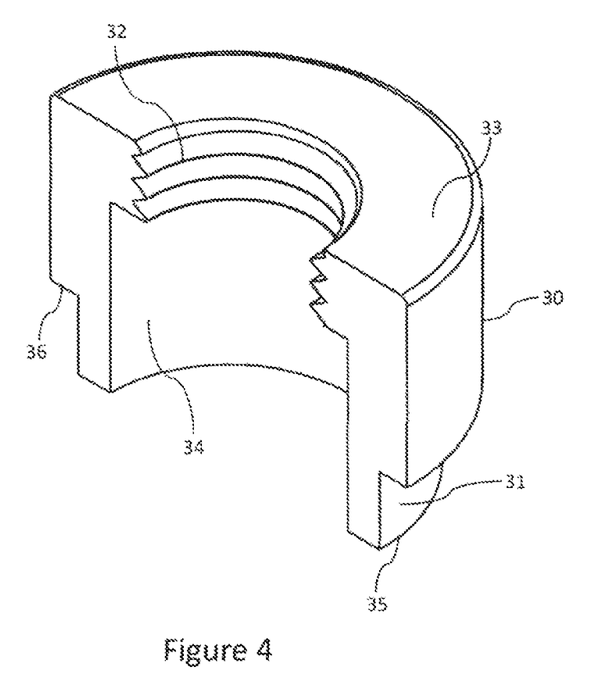
FIG. 4 is an isometric cross-sectional view of the standoff in accordance with the embodiments of the present invention.

Referring now to the drawings wherein like numerals refer to like elements, FIG. 3 shows an isometric view of the standoff in accordance with the embodiments of the present invention. The standoff 29 has an internally threaded cylindrical structure 30 including its shank portion 31 which is smaller in size and diameter to that of its upper part 30. The upper surface 33 of the cylindrical structure 30 is flat and circular. FIG. 4 represents a cross-sectional view of the standoff 29, wherein a part 32 of the cylindrical structure 30 is internally threaded. The demarcating portion of the upper and lower cylindrical portions of the standoff 29 defines a rim section 36. A section 34 below the internal threaded portion 32 comprising parts of upper cylindrical structure 30 and the shank portion 31 is unthreaded.

Figure 5:
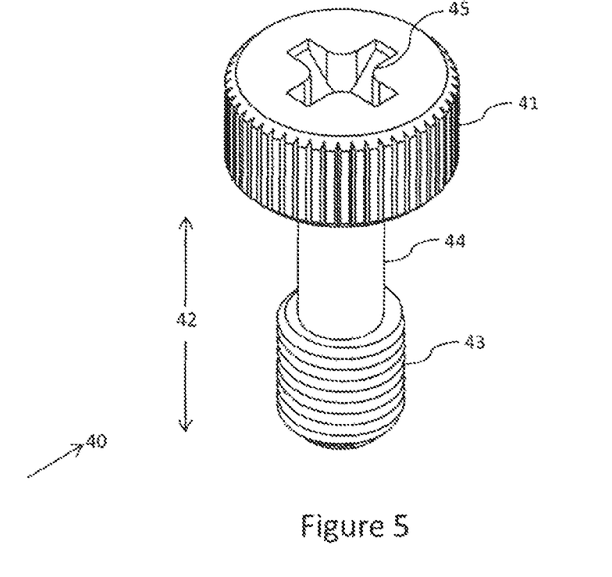
FIG. 5 is a perspective view of the fastener in accordance with the embodiments of the present invention.

As shown in FIG. 5, the fastener 40 includes a head 41 and a shaft 42. The shaft 42 comprising of a threaded section 43 and an unthreaded section 44 being interposed between the head 41 and the threaded section 43. The diameter of the threaded section 43 is greater than the diameter of the unthreaded section 44 of the shaft 42. The fastener head 41 is slotted 45 on its upper surface for receiving a screw driver, or other driving device. The outer circumference of the fastener head 41 may be textured for enhanced gripping by a user.

Figure 6:
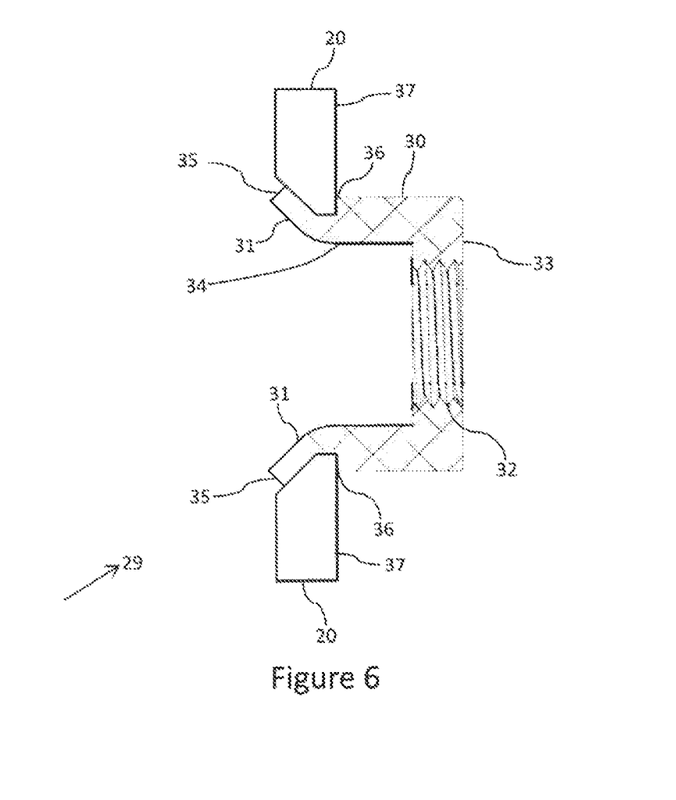
FIG. 6 is a sectional front view of the standoff permanently fastened to the first surface, in accordance with the principles of the present invention.

FIG. 6 shows a sectional view of the standoff 29 embodying the principles of the invention. As shown in FIG. 6, a hole is created on the first surface, for example, on face plate 20 wide enough to accommodate the shank portion 31 of the standoff 29. The shank portion 31 of the standoff 29 is inserted through the hole so that the rim 36 on the lower part of the cylindrical structure 30 abuts the facing surface 37 of the face plate 20. The distal end of the hollow shank portion 35 is subjected to a forming operation on the other side of the face plate 20 such that the shank portion 31 is deformed during such forming operation to form a permanent fastening joint such that the deformed part flushes with the other side of the first surface, for example face plate 20, in a frusto-conical shape. Forming is a mechanical process through which the plastic flow of the material takes place. For example flare-in, plastic bending and includes press-in operation also.

Figure 7:
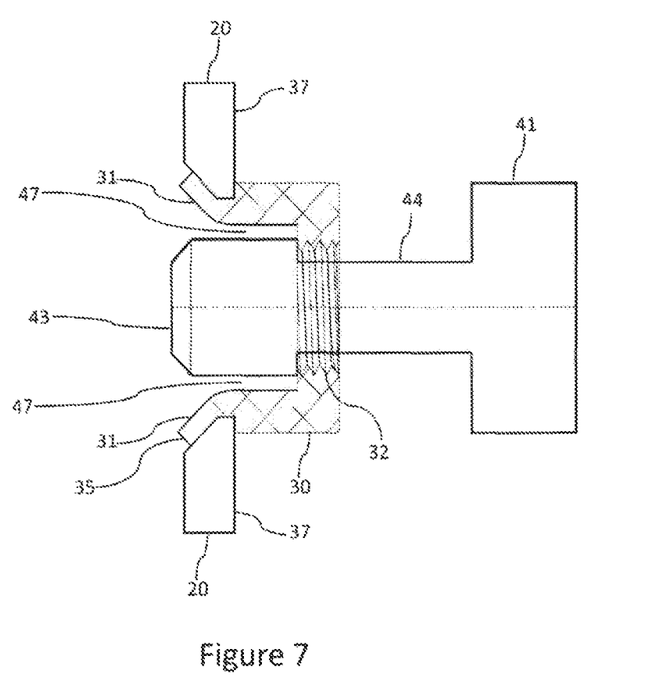
FIG. 7 is a sectional view of the captive fastener assembly in a disengaged state prior to the engagement with the other surface, in accordance with the embodiments of the present invention.

FIG. 7 shows the fastener 40 secured within the standoff 29 by inserting the fastener 40 into the standoffs internally threaded cylindrical structure 30 by initially engaging the threaded portion 43 of the fastener with the threaded portion 32 of the standoffs cylindrical structure. Threaded portion 43 of the fastener is represented as unthreaded in FIG. 7 and subsequent diagrams to avoid similar appearances of the threaded portion 32 of the shank with threaded portion 43 of the fastener 40. Once the threading is done, the shaft 44 of the fastener 40 moves freely within the hollow cylindrical space 47 inside the standoff. This enables the fastener 40 captivated within the standoff to have a free circular and angular movement. The length of the shaft 44, the threaded portion 43 of the fastener and the size of the standoff is so customized to suit specific thickness of mounting surfaces such that the movement of the shaft at any length within the hollow spherical space ends up with the corresponding movement only of the threaded portion 43 of the fastener within the gradient section of the shank portion 31 of the standoff.

Figure 8:
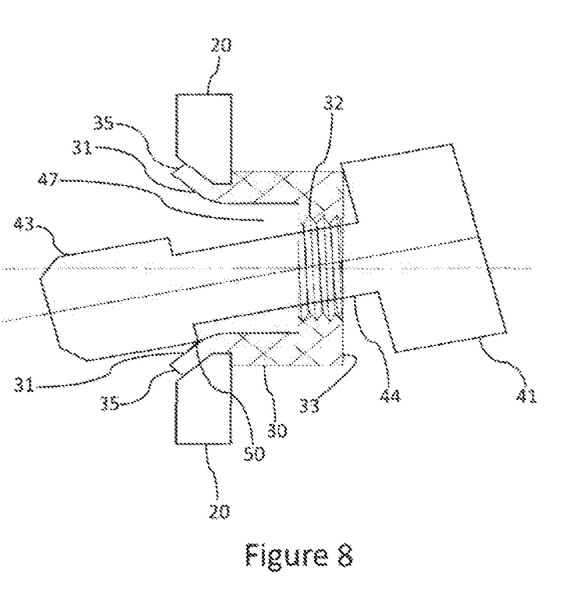
FIG. 8 is a sectional view of the captive fastener assembly in a disengaged state embodying a feature of the present invention.

The captive fastener assembly embodying an aspect of the invention is as shown in FIG. 8. The fastener comprising of a head 41 with the shaft 44 and the threaded portion 43 is inserted to the standoff permanently fastened to the first surface, for example a face plate 20. Owing to the angular movement of the shaft 44 within the hollow spherical space 47 inside the standoff, maximum gradient that may be suffered by the fastener with its head portion 41 intersecting the surface 33 of the standoff is as shown in FIG. 8. One end of the threaded portion 43 of the fastener may intersect the frusto-conical section of the shank portion 31 at the intersecting junction 50. When this captive fastener assembly is attached with the other surface, for example card cage, the receiving section of the card cage is likely to push the protrusion of the threaded portion 43 towards the hollow spherical space 47, thus provisioning for the alignment of the fastener with the receiving nut on the other surface. The retraction of the threaded portion 43 of the fastener is smoothly conducted due to the gradient offered by the frusto-conical part 31 of the shank portion.

Figure 9:
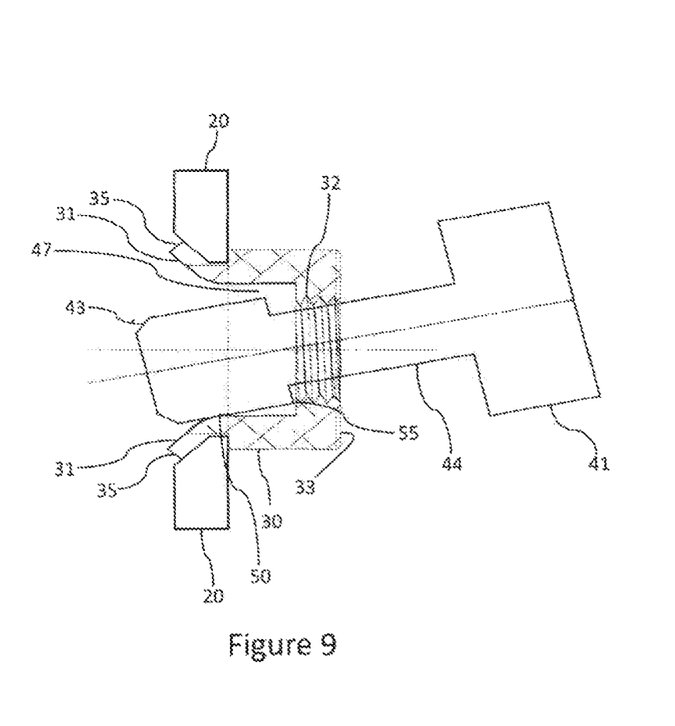
FIG. 9 is a sectional view of the captive fastener assembly in a disengaged state embodying yet another feature of the present invention.

The captive fastener assembly embodying yet another aspect of the invention is as shown in FIG. 9. The fastener comprising of a head 41 with the shaft 44 and the threaded portion 43 is inserted to the standoff permanently fastened to the first surface, for example a face plate 20. Owing to the angular movement of the shaft 44 within the hollow spherical space 47 inside the standoff, maximum gradient that may be suffered by the fastener with its threaded portion 43 completely retracted within the cylindrical portion 30 of the standoff and intersecting with the inside surface 55 of the standoff is as shown in FIG. 9. At this position only part of the threaded portion 43 of the fastener may intersect the frusto-conical section of the shank portion 31 at the intersecting junction 50. When this captive fastener assembly is attached with the other surface, for example card cage, the receiving section of the card cage is likely to push the protrusion of the threaded portion 43 towards the hollow spherical space 47, thus provisioning for the alignment of the fastener with the receiving floating nut on the other surface. The retraction of the threaded portion 43 of the fastener is smoothly conducted due to the gradient offered by the frusto-conical part 31 of the shank portion.

Figure 10:
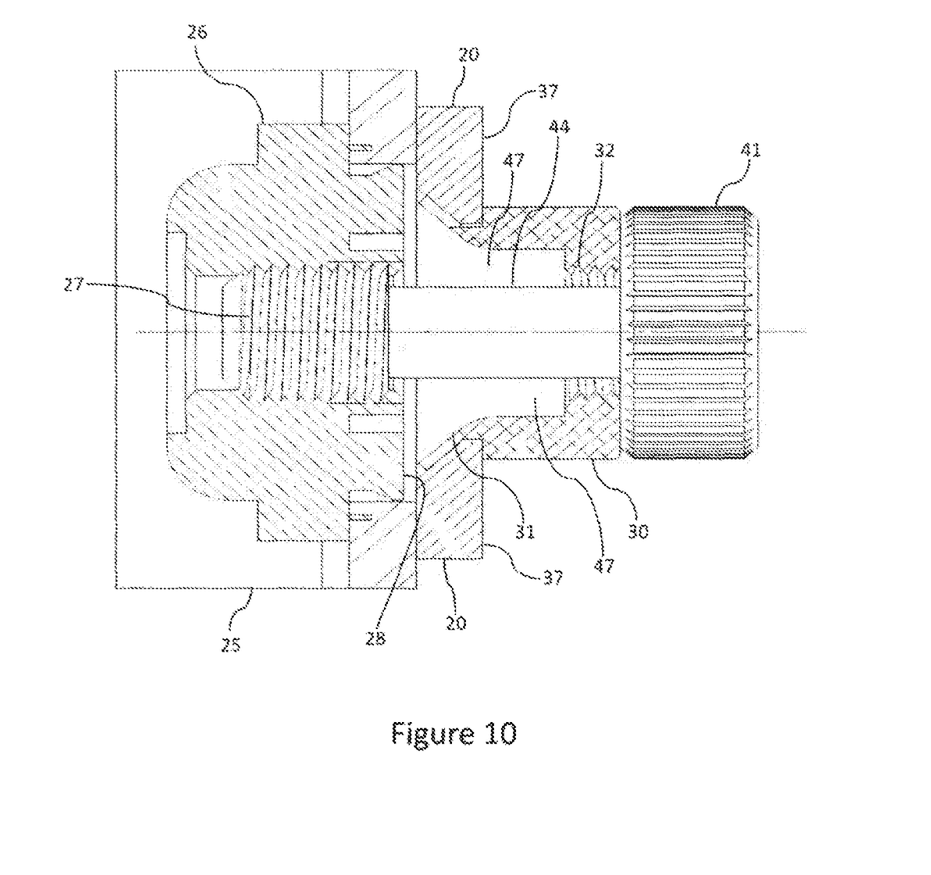
FIG. 10 is a sectional view of the captive fastener assembly in an engaged state with the other surface, embodying the principles of the present invention.

The captive fastener assembly embodying the principles of the present invention is as shown in FIG. 10. The fastener comprising of a head 41 with the shaft 44 and the threaded portion 43 is inserted to the standoff which is permanently fastened to the first surface, for example a face plate 20. The threaded portion 43 of the fastener completely retracted to the hollow spherical space 47 prior to the engagement of the fastener is in alignment with the receiving nut axis of the other surface, for example a card cage 25. The card cage 25 comprises of nut holder 26 captivating the receiving nut 27 and offering floating movement to the nut. The receiving nut 27 offers for a marginal offset for the alignment of fastener with the receiving nut. When the first surface, for example face plate 20 is placed parallel upon the other surface, for example card cage 25 for fastening the surfaces, the threaded portion 43 of the fastener is in alignment with the receiving nut axis because of the retracting motion offered to any part of the protruding threaded portion by the other surface on contact with its receiving surface 28 thereby removing the disadvantage of misalignment caused in the prior art. Further if the fastener head 41 gets either damaged or worn out subsequently by repeated usage, the fastener can be easily removed from the face plate by unscrewing it from the threaded section 32 of the standoff and then replaced by another fastener, instead of replacing the entire fastener assembly.

The captive fastener assembly comprising of the standoff wherein the external shape of the upper portion of the cylindrical internally threaded structure of the standoff pursuant to the principles of the invention may be either cylindrical, square or any shape and can be made from any desired material preferably aluminium.

It will thus be appreciated that those skilled in the art will be able to device numerous alternative arrangements that, while now shown or described herein, embody the principles of the invention and thus are within its spirit and scope.

What is claimed is:

1. A method for captive fastener assembly for fastening a plurality of surfaces by steps comprising:
   providing a fastener comprising a head and a shaft, the shaft comprising a threaded section and an unthreaded section being interposed between the head and the threaded section;
   providing a standoff on a first surface accommodating the fastener, wherein the standoff has an enlarged hollow internally threaded portion at one end, and a hollow shank portion at another end;
   forming a hole in the first surface and inserting the hollow shank portion of the standoff through the hole so that a rim on a lower part of the enlarged portion of the standoff abuts the first surface;
   forming a distal end of the hollow shank portion on another side of the first surface, wherein the hole is circular at the first surface abutting the rim portion, the distal end of the hollow shank portion is deformed during the forming operation to form a permanent fastening joint such that the deformed part flushes with the other side of the first surface in a frusto-conical shape;
   engaging the threaded section of the shaft of the fastener initially with the enlarged hollow internally threaded portion of the standoff and subsequently engaging the unthreaded portion of the shaft of the fastener with the enlarged hollow internally threaded portion of the standoff to allow free movement of the fastener inside the standoff; and fastening the first surface with another surface by placing the surfaces together so that the fastener is substantially aligned with a receiving nut on the other surface for coupling, wherein a marginal offset for alignment of the fastener with the receiving nut on the other surface is allowed.

2. The method of claim 1, further comprising:

engaging the fastener along an internally threaded enlarged portion of the standoff permanently fastened to the first surface, such that the engaged fastener has a substantial circular and angular floating movement.

3. The method of claim 1, wherein, the distal end of the shank has a generally flat hollow circular portion which upon forming by a forming tool deforms into the hole on the other side of the first surface, such that the deformed part is frusto-conical in shape and flushes with the other side of the first surface and no part of the permanent fastening joint on the shank portion protrudes on the other side of the first surface and wherein the enlarged portion of the standoff protrudes on the first surface.

4. The method of claim 1, wherein the fastener within the standoff aligns with the receiving nut on the other surface for coupling, when placed together with the other surface.

5. The method of claim 1, wherein the fastener within the standoff, when placed together with the other surface, owing to its circular and angular movement, if a part of the threaded section of the fastener protrudes in an inclined manner towards the other surface, the protruded portion upon contact with the other surface aligns with the receiving nut on the other surface for coupling.

6. A captive fastener assembly comprising:

a fastener comprising a head and a shaft, the shaft comprising a threaded section and an unthreaded section being interposed between the head and the threaded section; and a standoff provided on a first surface accommodating the fastener, wherein the standoff includes an enlarged hollow internally threaded portion at one end, and a hollow shank portion at another end, wherein a distal end of the hollow shank is adapted to deform during a forming operation to form a permanent fastening joint on the first surface such that the deformed part flushes with another side of the first surface in a frusto-conical shape, wherein the threaded section of the shaft of the fastener initially engages with the enlarged hollow internally threaded portion of the standoff and the unthreaded portion of the shaft of the fastener subsequently engages with the enlarged hollow internally threaded portion of the standoff to allow free movement of the fastener inside the standoff; and wherein the first surface when placed with the other surface together for fastening, the fastener is substantially aligned with a receiving nut on the other surface for coupling, wherein a marginal offset for alignment of the fastener with the receiving nut on the other surface is allowed.

7. A captive fastener assembly according to claim 6, wherein the fastener upon engagement with the enlarged portion of the standoff permanently fastened to the first surface, has a substantial circular and angular movement.

* * * * *